US010365534B2

(12) United States Patent
Nakata et al.

(10) Patent No.: US 10,365,534 B2
(45) Date of Patent: Jul. 30, 2019

(54) OPTICAL WAVEGUIDE DEVICE

(71) Applicant: Sumitomo Osaka Cement Co., Ltd., Chiyoda-ku, Tokyo (JP)

(72) Inventors: Yuu Nakata, Tokyo (JP); Katsutoshi Kondou, Tokyo (JP); Tetsuya Fujino, Tokyo (JP); Junichiro Ichikawa, Tokyo (JP)

(73) Assignee: SUMITMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/171,638

(22) Filed: Jun. 2, 2016

(65) Prior Publication Data

US 2017/0075188 A1 Mar. 16, 2017

(30) Foreign Application Priority Data

Apr. 3, 2015 (JP) ................. 2015-076516

(51) Int. Cl.
*G02F 1/225* (2006.01)
*G02F 1/01* (2006.01)
*G02B 6/00* (2006.01)
*G02F 1/21* (2006.01)

(52) U.S. Cl.
CPC .......... *G02F 1/2257* (2013.01); *G02F 1/0126* (2013.01); *G02F 1/2255* (2013.01); *G02F 2001/212* (2013.01); *G02F 2202/20* (2013.01)

(58) Field of Classification Search
CPC ................................. G02B 6/00; G02F 1/225
USPC ........................................................... 385/3
See application file for complete search history.

(56) References Cited

U.S. PATENT DOCUMENTS

| | | | | | |
|---|---|---|---|---|---|
| 4,403,825 | A | * | 9/1983 | Tangonan | G02B 6/1245 385/130 |
| 5,114,513 | A | * | 5/1992 | Hosokawa | G02B 3/08 156/150 |
| 5,186,750 | A | * | 2/1993 | Sugiura | C30B 23/02 117/103 |
| 5,273,932 | A | * | 12/1993 | Sugiura | C30B 23/02 117/103 |
| 5,492,776 | A | * | 2/1996 | Paz-Pujalt | C30B 23/02 428/696 |

(Continued)

FOREIGN PATENT DOCUMENTS

| JP | H05-224163 A | 9/1993 |
|---|---|---|
| JP | 2000-151008 A | 5/2000 |

(Continued)

OTHER PUBLICATIONS

Kostritskii, S.M., "Photorefractive Effect in LiNbO3-Based Integrated-Optical Circuits at Wavelengths of Third Telecom Window", Applied Physics B Lasers and Optics, Apr. 2, 2009, pp. 421-428, vol. 95.

(Continued)

*Primary Examiner* — Kaveh C Kianni
(74) *Attorney, Agent, or Firm* — Greer, Burns & Crain, Ltd.

(57) ABSTRACT

An optical waveguide device includes a substrate with an electro-optic effect on which an optical waveguide and an electrode for controlling optical waves propagating through the optical waveguide are formed and at least one light source for irradiating ultraviolet light on the substrate.

8 Claims, 6 Drawing Sheets

(56) References Cited

U.S. PATENT DOCUMENTS

| | | | | |
|---|---|---|---|---|
| 5,999,667 | A | * | 12/1999 | Castoldi ............... G02B 6/1342 385/2 |
| 6,210,867 | B1 | * | 4/2001 | You ........................ G02F 1/065 216/24 |
| 6,275,317 | B1 | * | 8/2001 | Doerr .................. H04B 10/505 398/183 |
| 6,684,007 | B2 | * | 1/2004 | Yoshimura ............... G02B 6/10 257/E23.01 |
| 7,359,581 | B2 | * | 4/2008 | Miyazaki ................ G02B 6/30 359/245 |
| 2003/0128950 | A1 | * | 7/2003 | Ackerman ......... H01S 5/06255 385/131 |
| 2005/0224946 | A1 | * | 10/2005 | Dutta ................. G02B 6/12002 257/686 |
| 2006/0079006 | A1 | * | 4/2006 | Yamamoto ............ G02F 1/3558 438/3 |
| 2006/0110089 | A1 | | 5/2006 | Ichikawa et al. |
| 2010/0073761 | A1 | * | 3/2010 | Lee ........................ G02B 6/421 359/326 |
| 2010/0165452 | A1 | * | 7/2010 | Furuya ................... C30B 15/00 359/326 |
| 2011/0103735 | A1 | | 5/2011 | Oikawa et al. |
| 2014/0111609 | A1 | * | 4/2014 | Yamaichi ............. G03H 1/0272 348/40 |

FOREIGN PATENT DOCUMENTS

| | | |
|---|---|---|
| JP | 2002-323638 A | 11/2002 |
| JP | 2003-089555 A | 3/2003 |
| JP | 2004-093905 A | 3/2004 |
| JP | 2009-033120 A | 2/2009 |
| JP | 2009-244811 A | 10/2009 |
| JP | 2010-033049 A | 2/2010 |
| JP | 2013-061454 A | 4/2013 |
| JP | 2013-140328 A | 7/2013 |
| JP | 2013-174744 A | 9/2013 |

OTHER PUBLICATIONS

Fuji, Y., Ostuka, Y., Ikea A., "Lithium Niobate as an Optical Waveguide and Its Application to Integrated Optics", IEICE Trans. Electron, May, 2007, pp. 1081-1089, vol. E90-C No. 5 (IEICE).

Betts, G.E., O'Donnell, F.J., Ray, K.G., "Effect of Annealing on Photorefractive Damage in Titanium-Indiffused LiNBO3 Modulators", IEEE Photonics Technology Letters, Feb., 1994, pp. 211-213, vol. 6 No. 1 (IEEE).

Wood, V.E., Cressman, P.J., Holman, R.L., Verber, C.M., "Photorefractive Effects in Waveguides", Topics in Applied Physics: Photorefractive Materials and Their Applications II, 1989, pp. 45-100, Vol. 62 (Springer-Verlag).

Beaumont, A.R., Atkins, C.G., Booth, R.C., "Optically Induced Drift Effects in Lithium Niobate Electro-Optic Waveguide Devices Operating at a Wavelength of 1.51 micro meters", Electronics Letters, Nov. 6, 1986, pp. 1260-1261, vol. 22 No. 23 (IEE).

Harvey, G. T., Astfalk, G., Feldblum A. Y., Kassahun, B., "The Photorefractive Effect in Titanium Indiffused Lithium Niobate Optical Directional Couplers at 1.3 Micro Meters", IEEE Journal of Quantum Electronics, Jun., 1986, vol. QE-22 No. 6 (IEEE).

* cited by examiner

OPTICAL WAVEGUIDE DEVICE

BACKGROUND OF THE INVENTION

Field of the Invention

The present invention relates to an optical modulation module for which a waveguide-type optical element constituted of an electro-optic material is used, and particularly to an optical waveguide device capable of enabling long-term operation by periodically eliminating characteristics changes caused as operating time elapses.

Description of Related Art

In the field of optical communication or optical measurement, light control elements such as waveguide-type optical modulators including an optical waveguide formed on a substrate with an electro-optic effect and a control electrode for controlling optical waves propagating inside the optical waveguide and the like are widely used.

As the above-described light control elements, for example, Mach-Zehnder (MZ)-type optical modulators in which lithium niobate (LiNbO$_3$) (also referred to as "LN"), which is a ferroelectric crystal, is used for substrates are widely used. Mach-Zehnder-type optical modulators include an incidence waveguide for introducing light from the outside, a branched waveguide for branching light introduced into the incidence waveguide into two light rays, two parallel waveguides for respectively propagating the two light rays branched using the branched waveguide, a multiplexing waveguide for multiplexing light that has propagated through the two parallel waveguides, and a Mach-Zehnder-type optical waveguide constituted of an emission waveguide for outputting light multiplexed using the multiplexing waveguide to the outside. In addition, Mach-Zehnder-type optical modulators include a control electrode for controlling optical waves propagating inside the parallel waveguides by shifting the phases of the optical waves using an electro-optic effect.

In Mach-Zehnder-type optical modulators, the intensity of light output from the multiplexing waveguide (multiplexed light) is modulated by shifting the phase difference between two light rays that have propagated through the two parallel waveguides using the control electrode. That is, when the phase difference is shifted between 0 and $\pi$, the intensity of the multiplexed light is changed between the ON state and the OFF state (zero intensity).

Meanwhile, the phase difference between the two light rays that have propagated through the two parallel waveguides shifts in response to a change in the ambient temperature or the elapsing of operating time, and, in response to this shift, the voltage applied to the control electrode (operating point) necessary for setting the phase difference to a predetermined value also changes (so-called bias drift). One of the causes for the occurrence of bias drift is bias drift attributed to a photorefractive effect. A Wavelength Division Multiplexing (WDM) optical fiber long-haul communication technique is a technique with an assumption of multi-channel optical amplification using an erbium-doped fiber amplifier or a Raman amplifier, and wavelengths are mainly in a 1,550 nm band. In addition, since the system has an assumption of the above-described amplification technique, the intensity of light input to the optical modulators is at most 10 mW to 20 mW. As light sources, semiconductor laser diodes are mainly used.

Meanwhile, in optical communication systems, there is an unchanging demand for extension of the propagation distances, and, in order to increase the intensity of optical signals sent from Mach-Zehnder-type optical modulators to optical fiber transmission channels, it becomes necessary to increase the intensity of light being input to the Mach-Zehnder-type optical modulators.

In the 1,550 nm wavelength band which is used for optical communication systems, regarding the light input tolerance in optical waveguide devices in which LN is used, there is a report that an incidence light power of 75 mW does not cause any characteristics changes such as phase shifts (effective bias shifts), optical insertion loss changes, optical extinction ratio changes, drive voltage changes, and the like for 100 hours (Non Patent Document 1). However, in principle, when the intensity of light input to Mach-Zehnder-type optical modulators becomes greater, the characteristics of optical materials that are used for the optical modulators change, and the modulation characteristics of the modulators may also change.

As the above-described characteristics changes in response to the input of high-power light, there are a variety of phenomena attributed to a photorefractive effect (Non Patent Documents 1 to 3). The photorefractive effect refers to a phenomenon in which, when high-power light is irradiated on optical materials, electrons at the impurity level and the like in the materials are excited and migrate into light-irradiated regions, and the migrated electrons are fixed in regions not irradiated with light or regions with a low light intensity out of the light-irradiated regions, whereby static electric fields are generated, and the static electric fields induce refractive index changes in the materials due to an electro-optic effect such as the Pockels effect or the like. A variety of phenomena described in Patent Document 2 are caused due to shapes, places, and the like in which refractive indexes change, and, accordingly, there is a concern that optical characteristics which are tested in Non Patent Document 1 may change.

In Mach-Zehnder-type optical modulators, it is known that, when, for example, the refractive index in at least a part of the parallel waveguides changes due to the photorefractive effect, the above-described light-induced bias drift occurs. In a case in which light is launched on a Mach-Zehnder-type optical waveguide formed in an LN substrate using a Ti diffusion method from a laser light source, bias drift in the optical waveguide is stable for approximately seven hours at a light input intensity of 75 mW (Non Patent Document 1).

Currently, the input rating specifications of a number of LN modulator products from major manufacturers of communication LN modulators are almost the same as this value. Meanwhile, there are only a small number of reports regarding examples of characteristics changes caused by the photorefractive effect in communication wavelength bands. Although it is said that, in LN modulators, the photorefractive effect does not significantly change a variety of characteristics, and LN modulators have high tolerance with respect to incidence of high-intensity light, Non Patent Document 4 describes that, as evaluation results of a case in which light in a 1,550 nm band is used as incidence light, in waveguides formed using an annealed proton-exchange process, the intensity of transmitted light is decreased due to the photorefractive effect by approximately 10% at a light incidence intensity of 100 mW or higher and by approximately 40% at a light incidence intensity of 300 mW.

Patent Document 5 describes that, in both optical waveguides formed using the annealed proton-exchange process and optical waveguides formed using the Ti diffusion method, incidence of light at a light incidence intensity of approximately 100 mW or higher causes changes in the branching ratios in Y branched waveguides or deteriorates the extinction ratios in MZ-type optical waveguides. As described above, it is known that, when the light input intensity reaches 100 mW or higher, the optical characteristics of optical waveguides significantly change due to the photorefractive effect even in a communication wavelength band of 1,550 nm, and long-term stable operation cannot be obtained.

In addition, in a communication wavelength band of a 1,310 nm band, Non Patent Document 3 describes that light incidence of 25 mW or higher causes characteristics changes in directional couplers in which LN waveguides are used. Meanwhile, Non Patent Document 6 describes that the photorefractive effect does not strongly change the characteristics of LN waveguides, light incidence of 125 mW or higher causes bias changes or extinction ratio changes in MZ-type modulators, and tolerance can be improved by means of annealing in reducing gas atmospheres. Patent Documents 1 and 2 describe means for suppressing the deterioration of optical characteristics by providing structures for avoiding two-beam interference in optical waveguide substrates. Patent Document 1 does not describe wavelengths but describes that the deterioration of optical characteristics is a phenomenon occurring at a light input intensity of 10 mW or higher.

In a case in which laser light sources having a narrow line width are used in order to enhance optical signal qualities (for example, optical signal-to-noise ratios (OSNR)) as in large-capacity optical communication use in which multi-level modulation (for example, quadrature phase shift keying (QPSK) or orthogonal frequency-division multiplexing (OFDM)), frequency multiplex modulation, ultrahigh-frequency time division multiplexing (TDM) or the like is used as a modulation method, optical measurement use requiring a high measurement accuracy, or the like, the coherency of output light from the light source is high, and thus the photorefractive effect is generated even when light having a lower power is input. For example, according to knowledge obtained by the inventors of the present invention through tests, in a case in which lasers having a narrow line width of 10 MHz or smaller are used as light sources, bias drift attributed to the photorefractive effect can be caused even at a light input intensity of 50 mW.

This bias drift attributed to the photorefractive effect gradually increases as the time for inputting optical signals having a high power elapses, and the bias drift can be compensated for by, for example, applying electric fields to optical waveguides using additive electrodes (bias electrodes) provided in the optical waveguides as long as the degree of the increase is not great (Patent Document 3). However, in a case in which the bias drift attributed to the photorefractive effect increases beyond the compensation range of the bias electrodes, optical modulation characteristics deteriorate due to bias drift beyond the compensation range.

In the related art, in a case in which the above-described characteristics deterioration is caused, it is necessary to dismount optical waveguide devices causing the characteristics deterioration from optical transmitters and replace the optical waveguide devices with new devices. However, optical waveguide devices are directly mounted on circuit boards which can be generally provided in optical transmitters by means of soldering, and thus it is difficult to dismount optical waveguide devices and exchange them with new optical waveguide. Therefore, in a case in which optical waveguide devices are dismounted and then are replaced with new optical waveguide devices, there are cases in which the circuit boards are damaged or other circuit components mounted on the circuit boards are damaged.

PATENT DOCUMENTS

[Patent Document 1] Japanese Laid-open Patent Publication No. 2004-93905
[Patent Document 2] Japanese Laid-open Patent Publication No. 2009-244811
[Patent Document 3] Japanese Laid-open Patent Publication No. 5-224163

NON PATENT DOCUMENTS

[Non Patent Document 1] A. R. Beaumont, C. G Atkins, and R. C. Booth, "Optically induced drift effects in lithium niobate electro-optic waveguide devices operating at a wavelength of 1.51 µm," Electron. Lett., Vol. 20, no. 23, pp. 1260 to 1261, 1986.
[Non Patent Document 2] V. E. Wood, "Photorefractive Effect in Waveguide," in Photorefractive Materials and Their Applications II—Topics in Applied Physics, ed. Gunter, P., and J. P. Huignard, Springer 1998.
[Non Patent Document 3] G T. Harvey, G Astfalk, A. Feldblum, and B, Kassahun, "The Photorefractive Effect in Titanium Indiffused Lithium Niobate Optical Directional Coupler at 1.3 µm," IEEE J. Quantum Electron, vol. QE-22, no. 6, pp. 893 to 946, 1986.
[Non Patent Document 4] Y. Fujii, Y. Otsuka, and A. Ikeda, "Lithium Niobate as an Optical Waveguide and Its Application to Integrated Optics," IEICE Trans. Electron., vol. 90-C, no. 5, pp. 1081 to 1089, 2007.
[Non Patent Document 5] S. M. Kostritskii, "Photorefractive effect in LiNbO3-based integrated-optical circuits at wavelengths of third telecom window," Applied. Physics, vol. B 95, no. 3, pp. 421 to 428, 2009.
[Non Patent Document 6] Betts, G E., F. J. O'Donnell, and K. G Ray. "Effect of annealing on photorefractive damage in titanium-indiffused LiNbO3 modulators." Photonics Technology Letters, IEEE vol. 6, no. 2, pp. 211 to 213, 1994.

SUMMARY OF THE INVENTION

An object that the present invention attempts to achieve is to provide an optical waveguide device capable of enabling long-term operation by timely eliminating characteristics changes attributed to the photorefractive effect which are caused by high-power optical signals input to optical waveguide devices including optical functional elements constituted of optical waveguides formed on substrates of electro-optic materials.

An aspect of the present invention is an optical waveguide device including a substrate with an electro-optic effect on which an optical waveguide and an electrode for controlling optical waves propagating through the optical waveguide are formed and at least one light source for irradiating ultraviolet light or violet light on the substrate.

According to another aspect of the present invention, the optical waveguide device has a housing package to accommodate the substrate, and the light source is included in the housing package.

According to still another aspect of the present invention, the optical waveguide device has a housing package to accommodate the substrate, the light source is disposed outside the housing package, and the housing package has a window transparent to ultraviolet light or violet light for irradiating on the substrate therethrough the ultraviolet light or violet light emitted by the light source.

According to still another aspect of the present invention, the window is a diffusion plate that diffuses and transmits the ultraviolet light or violet light.

According to still another aspect of the present invention, the light source is disposed at a location at which said light source can irradiate the ultraviolet light or violet light on the substrate through the window.

According to still another aspect of the present invention, the optical waveguide device includes a plurality of the light sources, and the plurality of light sources are arranged in a longitudinal direction of the substrate.

According to still another aspect of the present invention, irradiation of ultraviolet light or violet light by the light source on the substrate is carried out when an amount of bias drift in the control of the optical wave with the electrode exceeds a predetermined amount.

According to still another aspect of the present invention, an intensity of ultraviolet light or violet light that is irradiated on the substrate is 10 $mW/cm^2$ or higher.

Another aspect of the present invention is a method for eliminating or reducing a photorefractive effect generated in a substrate of an optical waveguide device having the substrate with an electro-optic effect on which an optical waveguide and an electrode for controlling optical waves propagating through the optical waveguide are formed and a housing package to accommodate the substrate having a window transparent to ultraviolet light or violet light for irradiating the ultraviolet light or violet light on the substrate, including: a step of irradiating emitted light from the light source of the ultraviolet light or violet light on the substrate through the window in the housing package.

DETAILED DESCRIPTION OF THE INVENTION

Hereinafter, embodiments of the present invention will be described with reference to the accompanying drawings.

First Embodiment

First, a first embodiment of the present invention will be described.

Figure 1A:
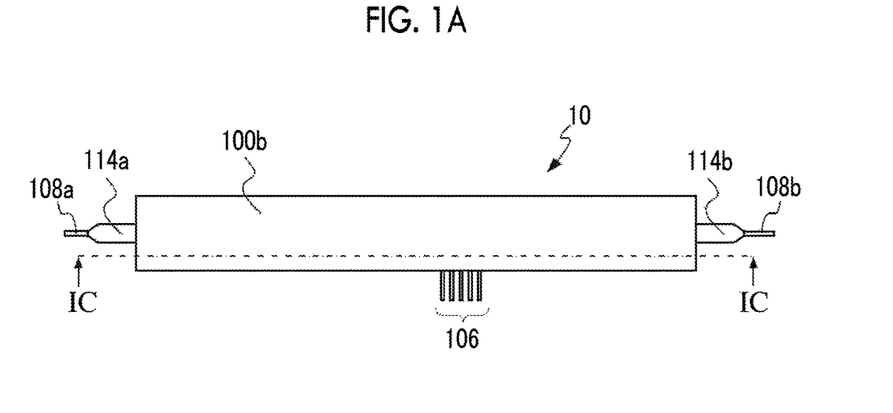
FIG. 1A is a view illustrating a constitution of an optical waveguide device according to a first embodiment of the present invention.
Figure 1B:
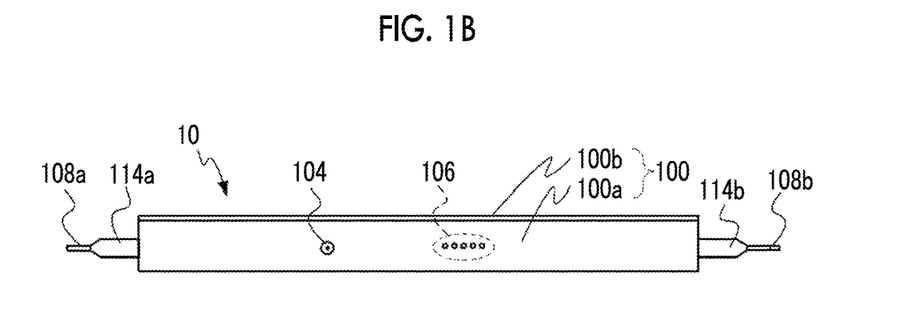
FIG. 1B is a view illustrating a constitution of an optical waveguide device according to a first embodiment of the present invention.
Figure 1C:
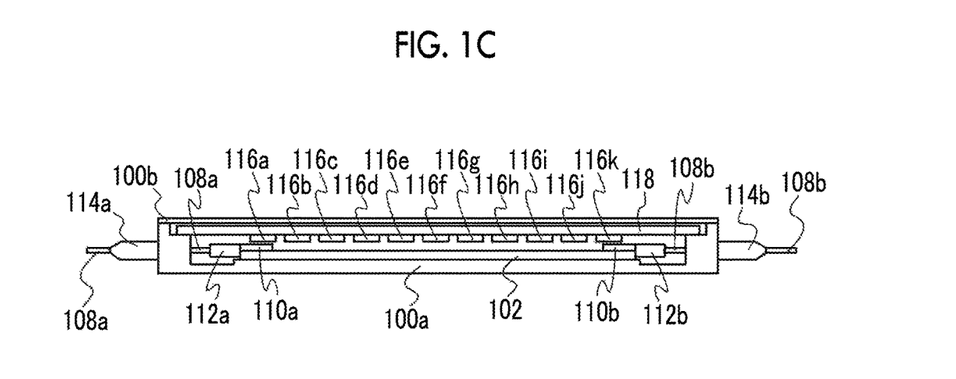
FIG. 1C is a view illustrating a constitution of an optical waveguide device according to a first embodiment of the present invention.

FIG. 1A is a top view illustrating the constitution of an optical waveguide device according to the first embodiment of the present invention, FIG. 1B is a front view illustrating the constitution of an optical waveguide device according to the first embodiment of the present invention, and FIG. 1C is a sectional view in a direction of an arrow IC illustrating the constitution of an optical waveguide device according to the first embodiment of the present invention.

An optical waveguide device 10 has a housing package 100 made up of a case 100a and a cover 100b and an optical functional element 102 accommodated in the housing package 100. The optical functional element 102 is an optical modulation element constituted of an LN substrate, a Mach-Zehnder-type optical waveguide formed on the surface (the upper side surface of the optical functional element 102 in the drawing) of the LN substrate, and electrodes (for example, an RF electrode to which high-frequency signals are applied and a bias electrode to which direct-current voltage is applied) formed on the Mach-Zehnder-type optical waveguide (the optical functional element 102 will be described below using FIG. 3).

In the housing package 100, a high-frequency connector 104 and an electric terminal array 106 are provided in order to input high-frequency signals and direct-current voltage for operating the optical functional element 102 from an external electronic device.

The optical waveguide device 10 has an optical fiber 108a that inputs light to an optical waveguide constituting the optical functional element 102 and an optical fiber 108b that guides emitted light from the optical waveguide outside the housing package 100. The optical fibers 108a and 108b and the optical waveguide in the optical functional element 102 are optically bonded together at end portions of the optical functional element 102 by abutting the optical fibers 108a and 108b and the optical waveguide.

Sleeves 112a and 112b are respectively fixed to end portions of the optical fibers 108a and 108b, and the optical fibers 108a and 108b are adhered and fixed to the optical waveguide. In addition, in the optical functional element 102, the optical fibers 108a and 108b, the sleeves 112a and 112b, and reinforcing members 110a and 110b for reinforcing the adhesion strength with the optical waveguide are provided.

The optical fibers 108a and 108b are respectively pulled out from the housing package 100 in the horizontal direction in the drawing through feedthroughs 114a and 114b.

Furthermore, the optical waveguide device 10 of the present embodiment has a plurality of light sources 116a to 116k for irradiating ultraviolet light or violet light on the optical waveguide (formed on the upper surface of the optical functional element 102 in the drawing) of the optical functional element 102. Here, ultraviolet light refers to light having wavelengths of 380 nm or shorter, and violet light refers to light having wavelengths in a range of 380 nm to 430 nm. The light sources 116a to 116k are, for example, chip LEDs and are attached to a printed substrate 118. In addition, the printed substrate 118 is attached to the case 100a using, for example, adhesives or solders.

Figure 2:
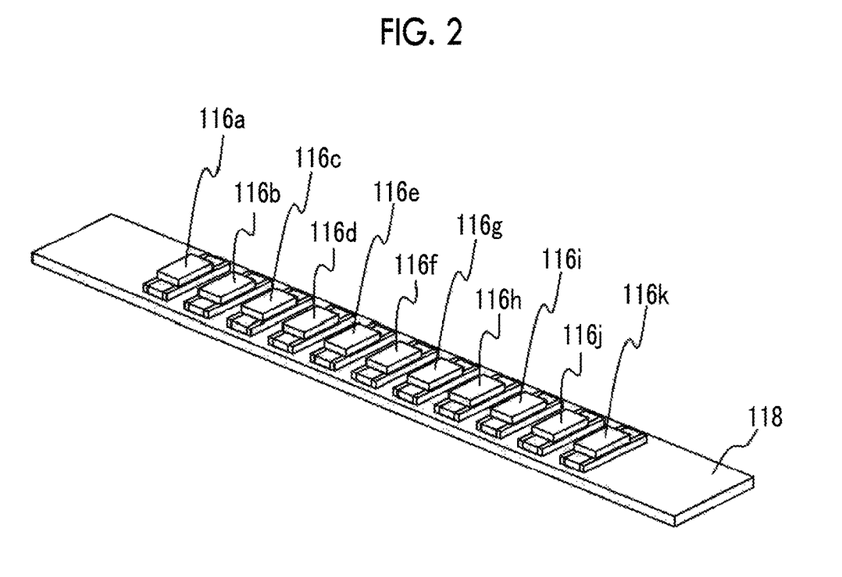
FIG. 2 is a view illustrating a printed substrate having light sources disposed thereon which is used in the optical waveguide device illustrated in FIG. 1.

FIG. 2 is a view illustrating the printed substrate 118 having the light sources 116a to 116k disposed thereon. The light sources 116a to 116k are arranged, for example, at equal intervals on the printed substrate 118 so that the light sources 116a to 116k are disposed in parallel in the longitudinal direction of an LN substrate 300 of the optical functional element 102 (FIG. 1C) when mounted in the optical waveguide device 10 and are, for example, electrically connected to each other in parallel using a conductive pattern (not illustrated) formed on the printed substrate 118. Regarding electric power sources for the light sources 116a to 116k, for example, it is possible to supply electric power from a part of electric terminals constituting the electric terminal array 106 provided in the housing package 100.

Meanwhile, in FIG. 2, the light sources 116a to 116k are illustrated to have, for example, an ordinary shape of chip LEDs, but the shape is not limited thereto. In addition, in FIG. 1C, the light sources 116a to 116k are schematically illustrated to have a rectangular shape, but the shape is not limited thereto.

Figure 3:
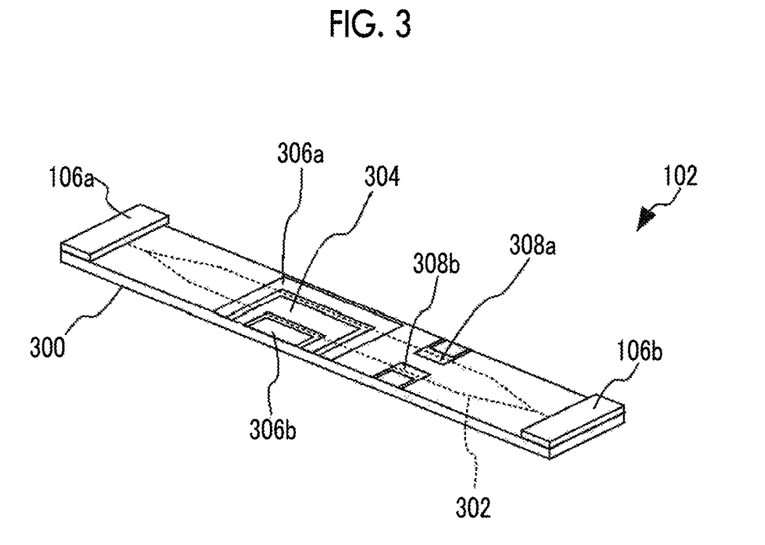
FIG. 3 is a view illustrating a constitution of an optical functional element which is used in the optical waveguide device illustrated in FIG. 1.

FIG. 3 is a view illustrating the optical functional element 102. The present optical functional element 102 is constituted of, for example, the X-cut LN substrate 300, a Mach-Zehnder-type optical waveguide 302 formed on a surface of the LN substrate 300, a high-frequency electrode 304 for controlling optical waves propagating through the optical waveguide 302 so as to carry out optical modulation, ground electrodes 306a and 306b, and bias electrodes 308a and 308b for compensating for bias drift. In addition, the reinforcing members 110a and 110b are disposed at both end portions of the LN substrate 300 which serve as the light input and output portions of the optical waveguide 302. In addition, in the present embodiment, as illustrated in FIG. 1C, the printed substrate 118 illustrated in FIG. 2 is disposed at a location opposite to the surface of the optical functional element 102 on which the optical waveguide 302 is formed and is constituted so that ultraviolet light from the light sources 116a to 116k disposed on the printed substrate 118 is irradiated on the LN substrate 300 of the optical functional element 102. Meanwhile, generally, the electrodes 304, 306a, 306b, 308a, and 308b are formed of metal such as Au or the like, but it is possible to use transparent electrodes constituted of conductive transparent materials (for example, indium tin oxide (ITO), indium zinc oxide (IZO), and the like) as the electrodes so that ultraviolet light irradiated from the light sources 116a to 116k efficiently reaches the LN substrate 300.

The optical waveguide device 10 having the above-described constitution is, as described above, constituted so that ultraviolet light or violet light from the light sources 116a to 116k can be irradiated on the LN substrate 300 constituting the optical functional element 102. Therefore, in a case in which, due to the photorefractive effect generated by high-power light input from the optical fiber 108a, optical characteristics deteriorate or the amount of bias drift increases over time, the drift amount exceeds a previously-specified threshold value, and thus it becomes impossible to maintain modulation characteristics, it is possible to eliminate or reduce bias drift caused by the photorefractive effect by putting the optical functional element 102 into a non-operation state (a state in which no electric fields are applied) while the optical waveguide device 10 remains mounted in optical transmitters and irradiating ultraviolet light or violet light to the LN substrate 300 of the optical functional element 102 from the light sources 116a to 116k.

That is, when electrons that are excited in the LN substrate 300, are migrated into other places, and are re-combined by high-power light input during the operation of the optical functional element 102, that is, in a state in which an electric field is applied using the electrode 304 and the like are, again, excited and migrated by ultraviolet light or violet light irradiated on the LN substrate 300 in a state in which the electric field is not applied, static electric fields caused by space charges generated in the LN substrate 300 are eliminated by the above-described re-combination. As a result, refractive index changes caused in the LN substrate 300 by the static electric fields are eliminated, and bias drift caused by the refractive index changes can be eliminated. In this case, the amount of ultraviolet light or violet light irradiated on the LN substrate 300 depends on wavelengths; however, in order to erase refractive index changes by means of approximately three-minute irradiation, the irradiation level of ultraviolet light or violet light is sufficiently 20 mW/cm$^2$ in the case of ultraviolet light of approximately 365 nm and 50 mW/cm$^2$ in the case of violet light of approximately 410 nm.

Since the effect of erasing is almost proportional to the product of irradiance and time, in a case in which the irradiation time for erasing is 60 minutes, the irradiance is sufficiently 1 mW/cm$^2$ in the case of ultraviolet light of approximately 365 nm and 2.5 mW/cm$^2$ in the case of violet light of approximately 410 nm. Furthermore, ultraviolet rays having shorter wavelengths, X-rays, and the like may be used, or the irradiation level may be weaker. Although the wavelengths of bias drift LN crystals at absorption ends are approximately near 380 nm, even when light having wavelengths of approximately 380 nm to 430 nm is used, substantial amount of light can be absorbed, and, even when violet light is used, it is possible to cause electrons to excite from valence bands beyond band gaps (forbidden bands), up to conduction bands, and migrate diffuse. Irradiation is desirably carried out in a uniform distribution as much as possible. When ultraviolet light or violet light is irradiated in a state in which there is an extremely strong contrast in the distribution of irradiance, and then irradiation is suddenly stopped, there are cases in which space-charge formations in accordance with the irradiance contrast and the distribution are fixed in LN crystals, and thus refractive index distributions are caused. Even when the irradiance contrast between points 1 μm away from each other is approximately 1.5, the refractive index difference caused between both points is approximately $10^{-6}$, and there is no problem with optical characteristics.

In addition, the irradiance level does not need to be maintained constant, and the integrated intensity of irradiance needs not to significantly differ at adjacent portions. When ultraviolet light or violet light is irradiated on guided light places causing the deterioration of optical characteristics or the occurrence of drift, refractive index changes can be erased; however, even when ultraviolet light or violet light is irradiated on other places, the qualities of devices do not change or deteriorate, and thus it is not necessary to limit irradiation places to optical waveguide portions, action portions, and the like.

Meanwhile, the previously-specified threshold value of the amount of bias drift can be set to, for example, equal or smaller than the upper limit amount of bias drift that can be compensated for using the bias electrodes 308a and 308b in the optical functional element 102. In addition, whether or not the amount of bias drift reaches the threshold value can be determined by comparing voltage values required in the bias electrodes 308a and 308b for the compensation of current bias drift with voltage values required for the compensation of the amount of bias drift of the above-described threshold value.

Furthermore, when organic deposited substances and attached substances such as residual monomers, solvents, antistatic agents, plasticizers, flame retardants, antioxidants, reaction products thereof, and the like which are generated as outer gas from adhesives, conductive resins, sealing agents, and the like in electrodes (not illustrated) formed on the LN substrate 300 are decomposed by irradiating ultraviolet light or violet light on the optical functional element 102 using the light sources 116a to 116k, it is also possible to prevent space-charge layers from being formed between the electrodes due to the growth of the organic deposited substances and attached substances.

Since the drift-velocity of space charges is slow, the electric field profile of high-frequency components (megahertz or longer) of electric signals are barely affected even when space-charge layers are formed between the electrodes, however, space-charge layers have an action of canceling bias signals or low-frequency signals (several hundred hertz or shorter), and thus DC bias electric field signals applied between the electrodes are disabled, and so-called bias drift is caused. This phenomenon is particularly serious in constitutions in which electrodes are formed on electro-optic substrates without any buffer layers or charge diffusion films therebetween. Therefore, space-charge layers formed between electrodes need to be erased.

In this case, the amount of ultraviolet light or violet light irradiated on the LN substrate 300 significantly depends on wavelengths, but the level of ultraviolet light or violet light irradiated is desirably 20 mW/cm² in the case of ultraviolet rays of approximately 365 nm and 150 mW/cm² in the case of ultraviolet rays of approximately 410 nm. Erase effects depend on wavelengths more than on irradiation time. Ultraviolet rays having wavelengths of 200 nm or shorter which are generally used for optical cleaning are more desirable.

Second Embodiment

Next, a second embodiment of the present invention will be described. In an optical waveguide device of the present embodiment, instead of disposing a plurality of light sources such as LEDs or the like in parallel as the light sources that emit ultraviolet light or violet light, light from a single light source of ultraviolet light or violet light is irradiated on almost all or part of the region of the LN substrate of the optical functional element through a light-guiding plate.

Figure 4A:
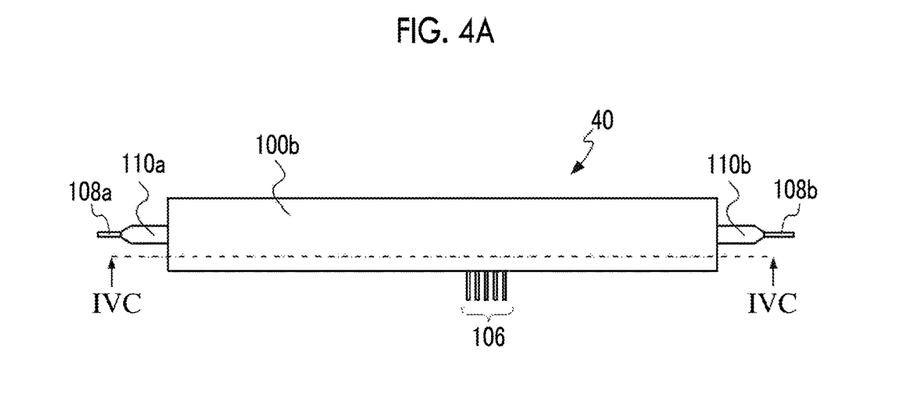
FIG. 4A is a view illustrating a constitution of an optical waveguide device according to a second embodiment of the present invention.
Figure 4B:
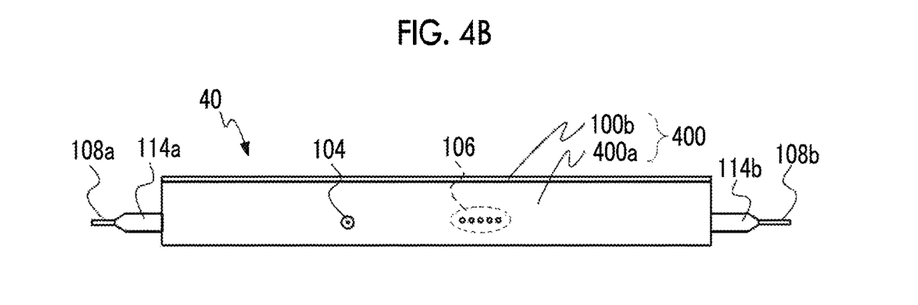
FIG. 4B is a view illustrating a constitution of an optical waveguide device according to a second embodiment of the present invention.
Figure 4C:
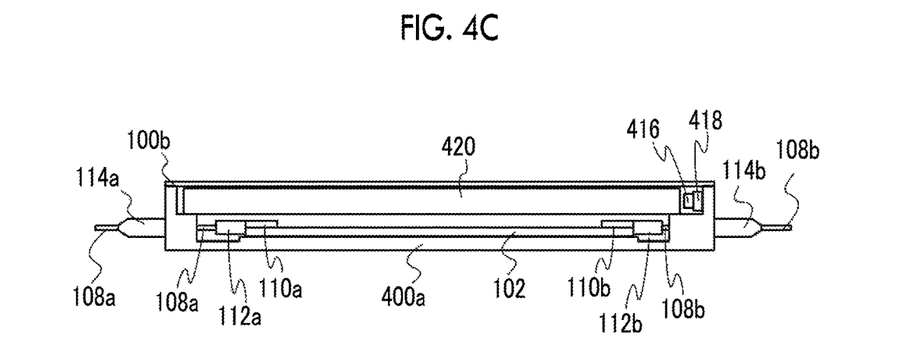
FIG. 4C is a view illustrating a constitution of an optical waveguide device according to a second embodiment of the present invention.

FIG. 4A is a top view illustrating the constitution of the optical waveguide device according to the second embodiment of the present invention, FIG. 4B is a front view illustrating the constitution of the optical waveguide device according to the second embodiment of the present invention, and FIG. 4C is a sectional view in a direction of an arrow IVC illustrating the constitution of the optical waveguide device according to the second embodiment of the present invention. Meanwhile, in FIG. 4A, FIG. 4B, and FIG. 4C, the same constitutional elements as those in FIG. 1 illustrating the first embodiment will be given the same reference signs as in FIG. 1A, FIG. 1B, and FIG. 1C, and the above-described description in the first embodiment will be quoted.

An optical waveguide device 40 has the same constitution as in the first embodiment, however, instead of the light sources 116a to 116f arranged in parallel in the longitudinal direction of the LN substrate 300, a light source 416 that emits ultraviolet light or violet light which is mounted in a circuit board 418 and a light-guiding plate 420 are accommodated in a housing package 400 constituted of a case 400a and the cover 100b. Therefore, ultraviolet light or violet light emitted from the light source 416 in the left direction in the drawing is launched into the light-guiding plate 420 through the right end portion in the drawing and is distributed in almost the entire region of the optical functional element 102 by the light-guiding plate 420.

Meanwhile, as the light source 416, similar to the light source 116a and the like in FIG. 1A, FIG. 1B, and FIG. 1C, for example, LEDs and the like that emit ultraviolet light or violet light can be used. In addition, in the present embodiment, a single light source 416 that emits ultraviolet light or violet light is used, and the emitted light is launched into the light-guiding plate 420 through an end portion on the right side in the drawing, but the light source is not limited thereto, and it is also possible to provide a plurality of the light sources 416. For example, the light sources 416 may be respectively disposed on both (right and left) end portions of the light-guiding plate 420 in FIG. 4A, FIG. 4B, and FIG. 4C, and ultraviolet light may be launched through both end portions and be distributed in individual regions of the optical functional element 102. In such a case, it is possible to increase the power of ultraviolet light irradiated on the optical functional element 102.

In the optical waveguide device 40 according to the present embodiment, similar to the optical waveguide device 10 according to the first embodiment, in a case in which, due to the photorefractive effect generated by high-power light input from the optical fiber 108a, the amount of bias drift in the optical functional element 102 increases over time, and the drift amount exceeds a previously-specified threshold value, it is possible to eliminate or reduce bias drift caused by the photorefractive effect by putting the optical functional element 102 into a non-operation state (a state in which no electric fields are applied) while the optical waveguide device remains mounted in optical transmitters and irradiating ultraviolet light or violet light from the light source 416 to the LN substrate 300 of the optical functional element 102 through the light-guiding plate 420.

In addition, similar to the optical waveguide device 10, when organic deposited substances and attached substances such as residual monomers, solvents, antistatic agents, plasticizers, flame retardants, antioxidants, soldering fluxes, reaction products thereof, and the like which are generated as outer gas from adhesives, conductive resins, sealing agents, and the like are decomposed by irradiating ultraviolet light or violet light on the LN substrate 300 as described above, it is also possible to prevent space-charge layers from being formed between electrodes due to the growth of the organic deposited substances and attached substances.

Third Embodiment

Next, a third embodiment of the present invention will be described. An optical waveguide device of the present embodiment is constituted of an optical functional unit having an optical functional element accommodated in a housing package and a light source unit having a light source for irradiating ultraviolet light or violet light on an LN substrate of the optical functional element in the optical functional unit. In addition, ultraviolet light or violet light emitted from the light source unit is irradiated on the LN substrate of the optical functional element accommodated in the optical functional unit through a window provided in the housing package of the optical functional unit.

Figure 5A:
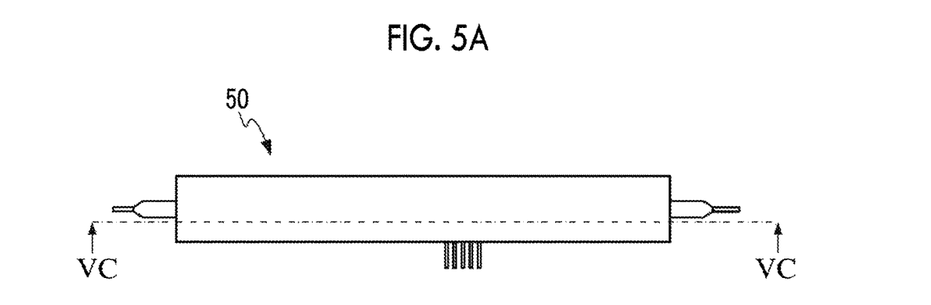
FIG. 5A is a view illustrating a constitution of an optical waveguide device according to a first embodiment of the present invention.
Figure 5B:
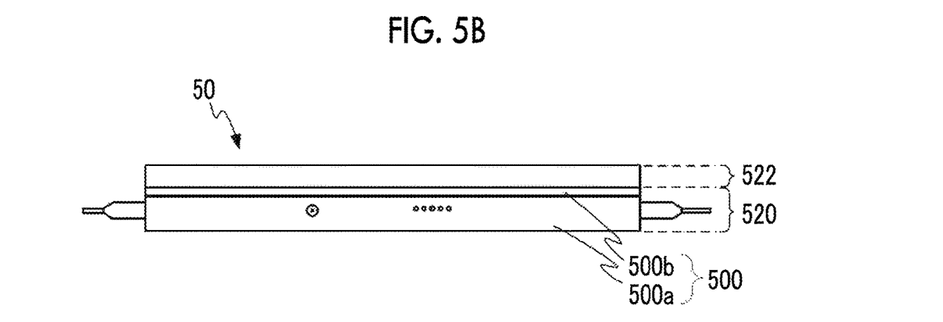
FIG. 5B is a view illustrating a constitution of an optical waveguide device according to a first embodiment of the present invention.
Figure 5C:
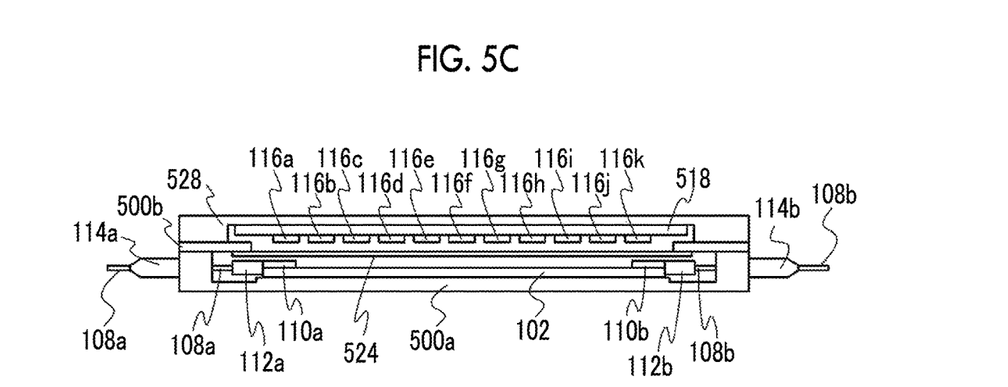
FIG. 5C is a view illustrating a constitution of an optical waveguide device according to a first embodiment of the present invention.

FIG. 5A is a top view illustrating the constitution of the optical waveguide device according to the first embodiment of the present invention, FIG. 5B is a front view illustrating the constitution of the optical waveguide device according to the first embodiment of the present invention, and FIG. 5C is a sectional view in a direction of an arrow VC illustrating the constitution of the optical waveguide device according to the first embodiment of the present invention. Meanwhile, in FIG. 5A, FIG. 5B, and FIG. 5C and FIG. 6A, FIG. 6B, and FIG. 6C described below, the same constitutional elements as those in FIG. 1A, FIG. 1B, and FIG. 1C illustrating the first embodiment will be given the same reference signs as in FIG. 1A, FIG. 1B, and FIG. 1C, and the above-described description in the first embodiment will be quoted.

The present optical waveguide device 50 is constituted of an optical functional unit 520 having the optical functional element 102 in a housing package 500 and a light source unit 522 having the light sources 116a to 116k that emit ultraviolet light or violet light.

Figure 6A:
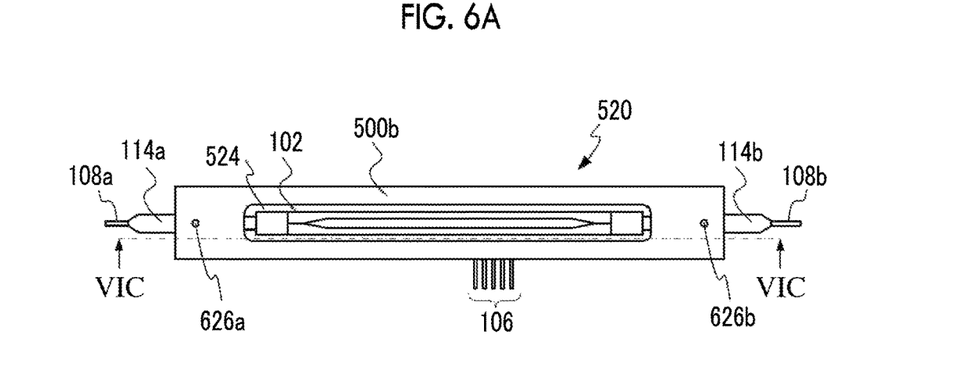
FIG. 6A is a view illustrating a constitution of an optical functional unit in the optical waveguide device illustrated in FIG. 5.

FIG. 6A is a top view thereof illustrating the constitution of the optical functional unit 520 illustrated in FIG. 5A, FIG. 5B, and FIG. 5C, FIG. 6B is a front view illustrating the constitution of the optical functional unit 520 illustrated in FIG. 5A, FIG. 5B, and FIG. 5C, and FIG. 6C is a sectional view in a direction of an arrow VIC illustrating the constitution of the optical functional unit 520 illustrated in FIG. 5A, FIG. 5B, and FIG. 5C. The present optical functional unit 520 has the housing package 500 made up of a case 500a and a cover 500b and the optical functional element 102 accommodated in the housing package 500. In the cover 500b, a window 524 transparent to ultraviolet light or violet light emitted from the light sources 116a to 116k in the light source unit 522 is provided. As the window 524, it is possible to use diffusion plates constituted of, for example, a diffusion plate made of fused silica having a wedge shape so that ultraviolet light or violet light emitted from the light sources 116a to 116k is uniformly irradiated on the LN substrate 300 in the optical functional element 102.

Figure 6B:
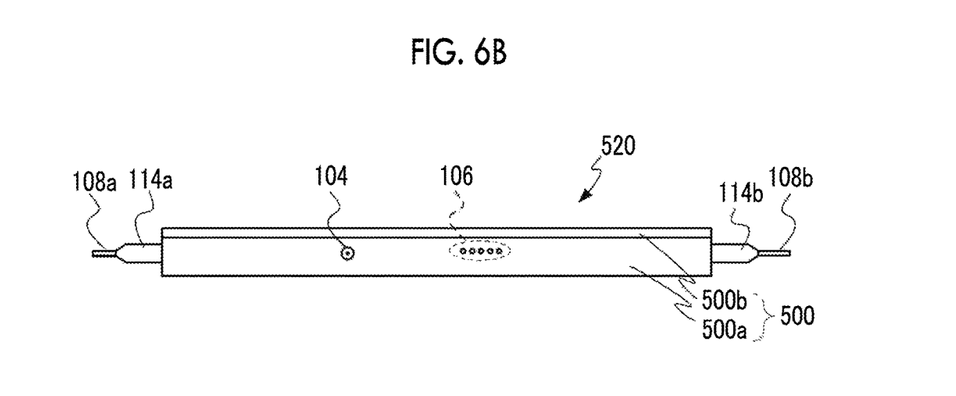
FIG. 6B is a view illustrating a constitution of an optical functional unit in the optical waveguide device illustrated in FIG. 5.
Figure 6C:
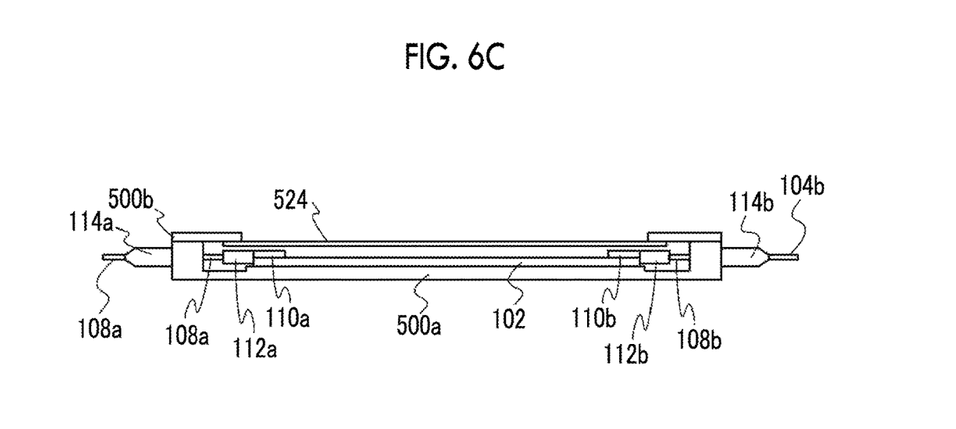
FIG. 6C is a view illustrating a constitution of an optical functional unit in the optical waveguide device illustrated in FIG. 5.

Furthermore, the diffusion plate is not limited thereto, and it is possible to use any members as long as the members function so that ultraviolet light or violet light is uniformly irradiated on the LN substrate 300 in the optical functional element 102.

In addition, the cover 500b is provide with holes 626a and 626b to which pins 730a and 730b, which are provided in the light source unit 522 described below in order to bond the light source unit 522 to the optical functional unit 520 and regulate the relative locations of these units, are inserted.

Figure 7A:
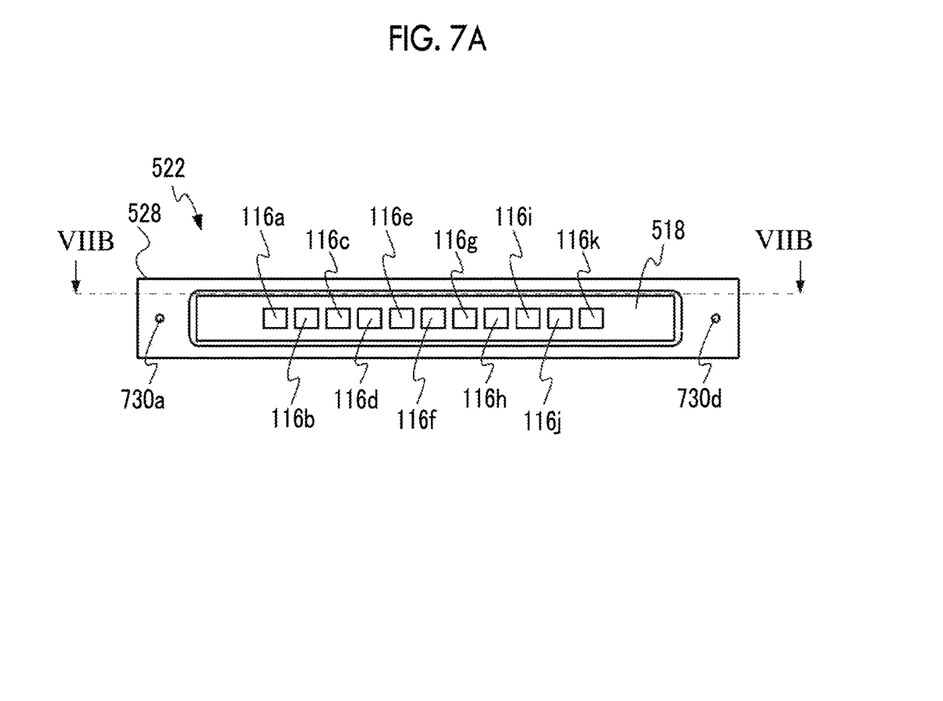
FIG. 7A is a view illustrating a constitution of a light source unit in the optical waveguide device illustrated in FIG. 5.

FIG. 7A is a bottom view of the light source unit 522 seen from the bottom of FIG. 5A, FIG. 5B, and FIG. 5C which illustrates the constitution of the light source unit 522 illustrated in FIG. 5A, FIG. 5B, and FIG. 5C, and FIG. 7B is a sectional view in a direction of an arrow VIIB illustrating the constitution of the light source unit 522 illustrated in FIG. 5A, FIG. 5B, and FIG. 5C. The present light source unit 522 has a case 528, a printed substrate 518 disposed in a concave portion provided on one surface of the case 528, and the light sources 116a to 116k mounted on the printed substrate 518. The light sources 116a to 116k are, similar to in the optical waveguide device 10 according to the first embodiment, disposed in parallel in a direction corresponding to the longitudinal direction of the LN substrate 300 in the optical functional element 102.

Figure 7B:
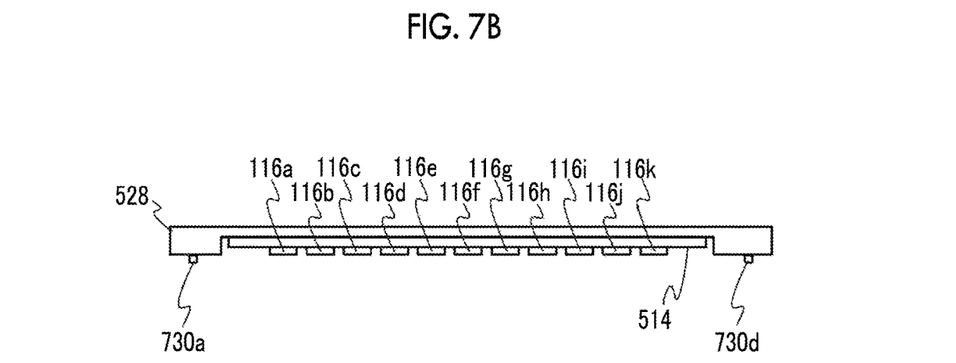
FIG. 7B is a view illustrating a constitution of a light source unit in the optical waveguide device illustrated in FIG. 5.

In addition, the case 528 in the light source unit 522 is provide with the pins 730a and 730b that are fitted into the holes 626a and 626b provided in the cover 500b in the optical functional unit 520 so as to bond the light source 522 to the optical functional unit 520 and regulate the relative locations of these units.

Meanwhile, to supply electric power to the light sources 116a to 116f, it is possible to use electric power sources connected to a part of terminals of the electric terminal array 106. For example, electric power can be supplied to the light sources by supplying electricity input to a part of the terminals of the electric terminal array 106 to a wire pattern in the printed substrate 518 through the holes 626a and 626b and the pins 730a and 730b and supply power to the light sources 116a to 116f from the wire pattern. Alternatively, electric power may be directly supplied to the printed substrate 518 from external electric power source devices.

In the optical waveguide device 50 having the above-described constitution, similar to the optical waveguide device 10 according to the first embodiment, in a case in which, due to the photorefractive effect generated by high-power light input from the optical fiber 108a, the amount of bias drift increases over time, and the drift amount exceeds a previously-specified threshold value, it is possible to eliminate or reduce bias drift caused by the photorefractive effect by putting the optical functional element 102 into a non-operation state (a state in which no electric fields are applied) while the optical waveguide device 50 remains mounted in optical transmitters and irradiating ultraviolet light from the light sources 116a to 116f to the LN substrate 300 of the optical functional element 102 through the window 524.

In addition, similar to the optical waveguide device 10, when organic deposited substances and attached substances such as residual monomers, solvents, antistatic agents, plasticizers, flame retardants, antioxidants, soldering fluxes, reaction products thereof, and the like which are generated as outer gas from adhesives, conductive resins, sealing agents, and the like are decomposed by irradiating ultraviolet light or violet light on the LN substrate 300 as described above, it is also possible to prevent space-charge layers from being formed between electrodes due to the growth of the organic deposited substances and attached substances.

Meanwhile, the optical functional unit 520 and the light source unit 522 may be bonded together using the holes 626a and 626b and the pins 730a and 730b so as to be integrally constituted and may be mounted on circuit boards and the like in optical transmitters. Alternatively, the optical functional unit and the light source unit may be constituted so as to be attachable to and detachable from each other, and only the optical functional unit 520 may be mounted on circuit boards and the like in optical transmitters. In a case in which only the optical functional unit 520 is mounted on a circuit board or the like in an optical transmitter, when the amount bias drift in the optical functional element 102 exceeds a predetermined amount, it is possible to eliminate or reduce bias drift caused by the photorefractive effect by bonding the light source unit 522 to the optical functional unit 520 using the holes 626a and 626b and the pins 730a and 730b in a state in which the optical functional unit 520 remains mounted in the circuit board or the like in the optical transmitter or is removed from the circuit board and irradiating ultraviolet light or violet light to the optical functional element 102.

In addition, the present embodiment has a constitution in which the light source unit 522 can be bonded to the optical functional unit 520 using the holes 626a and 626b and the pins 730a and 730b, but the constitution is not limited thereto, and the light source unit 522 and the optical functional unit 520 may not be provided with any structures for bonding such as the holes 626a and 626b and the pins 730a and 730b. In this case, only the optical functional unit 520 is mounted on a circuit board or the like in an optical transmitter, and, for example, when the amount bias drift exceeds a specified amount, and thus it becomes necessary to irradiate ultraviolet light, it is possible to irradiate ultraviolet light on the LN substrate 300 in the optical functional element 102 in the functional unit 520 through the window 524 in the optical functional unit 520 from the light source unit 522 by disposing the light source unit 522 close to and outside the optical functional unit 520 in a state in which the optical functional unit 520 remains mounted in the circuit board or the like in the optical transmitter or is removed from the circuit board.

In addition, it is also possible to mount the optical functional unit 520 in a circuit board or the like disposed in an optical transmitter, dispose the light source unit 522 in advance in the optical transmitter so as to be close to the outside of the optical functional unit 520, and irradiate ultraviolet light on the LN substrate 300 in the optical functional element 102 in the optical functional unit 520 through the window 524 in the optical functional unit 520 using the light source unit 522 when the amount of bias drift exceeds a predetermined amount, and thus it becomes necessary to irradiate ultraviolet light.

In addition, in the present embodiment, ultraviolet light is irradiated on the LN substrate 300 using the light sources 116a to 116k disposed in parallel in a direction corresponding to the longitudinal direction of the LN substrate 300 in the optical functional element 102, but the disposition direction of the light sources is not limited thereto, and it is possible to arbitrarily dispose the light sources as long as bias drift is eliminated instead of disposing the light sources 116a to 116k in parallel in a direction corresponding to the longitudinal direction of the LN substrate 300.

In addition, instead of the light sources 116a to 116k, the light-guiding plate 420 and the light source 416 which have been described in the second embodiment may be used. In addition, instead of the light sources 116a to 116f, it is possible to use cold-cathode tubes or other arbitrary light sources that emit ultraviolet light.

Furthermore, it is also possible to accommodate the light-guiding plate in the housing package 500 in the optical functional unit 520 and expose the light incidence end of the light-guiding plate to the outside of the housing package 500 instead of the window 524. In this case, the light source unit 522 may include at least one of the light sources 116a to 116k or other arbitrary light sources that emit ultraviolet light or violet light so that ultraviolet light or violet light is launched on the light input end of the light-guiding plate.

In addition, in the present embodiment, the optical functional element having the LN substrate has been exemplified, but the present invention is not limited to LN substrates, and any optical waveguide devices belong to the present invention as long as substrates causing the photorefractive effect are accommodated in housing packages.

In addition, in the present embodiment, as the constitution of the optical waveguide, the Mach-Zehnder-type optical waveguide has been exemplified, but the present invention is not limited to Mach-Zehnder-type optical waveguides. For example, the present invention may be any optical waveguide devices constituted of linear waveguides such as phase modulators and the like.

In addition, in the present embodiment, examples in which bias drift caused by the photorefractive effect is eliminated or reduced have been described, but the present invention is not limited thereto, and any cases in which optical losses, changes in operating voltage, or characteristics deterioration such as deterioration of the extinction ratio of emitted light from optical waveguides, and the like are eliminated or reduced also belong to the present invention.

As described above, the optical waveguide devices 10, 40, and 50 according to the present embodiments include the light sources 116a to 116f or the light source 416 and the light-guiding plate 420 for irradiating ultraviolet light or violet light on the LN substrate 300 in the optical functional element 102 in which the optical waveguide 302 is formed in the housing package 100 or 400 to accommodate the optical functional element 102 or in the housing package 500 to accommodate the optical functional element 102. Therefore, it is possible to eliminate or erase bias drift in the optical functional element 102 caused by the photorefractive effect in a state in which the optical waveguide device 10, 40, or 50 remain mounted in, for example, optical transmitters.

10, 40, 50 . . . optical waveguide device, 100, 400, 500 . . . housing package, 100a, 400a, 500a, 528 . . . case, 100b, 500b . . . cover, 102 . . . optical functional element, 104 . . . high-frequency connector, 106 . . . electric terminal array, 108a, 108b . . . optical fiber, 110a, 110b . . . reinforcing member, 112a, 112b . . . sleeve, 114a, 114b . . . feedthrough, 116a to 116k, 416 . . . light source, 118, 418, 518 . . . printed substrate, 300 . . . LN substrate, 302 . . . optical waveguide, 304 . . . high-frequency electrode, 306a, 306b . . . ground electrode, 308a, 308b . . . bias electrode, 420 . . . light-guiding plate, 520 . . . optical functional unit, 522 . . . light source unit, 524 . . . window, 626a, 626b . . . hole, 730a, 730b . . . pin

What is claimed is:
1. An optical waveguide device comprising:
a housing package;
a substrate with an electro-optic effect which is accommodated in the housing package and on which an optical waveguide and an electrode for controlling optical waves propagating through the optical waveguide are formed; and
at least one light source for irradiating ultraviolet light or violet light on the substrate in a state in which an electric field is not applied to the substrate,
wherein irradiation of ultraviolet light or violet light on the substrate with the light source is carried out when an amount of bias drift in the control of the optical wave with the electrode exceeds a predetermined amount.

2. The optical waveguide device according to claim 1, wherein the light source is included in the housing package.

3. The optical waveguide device according to claim 1, comprising:

a housing package to accommodate the substrate, wherein the light source is disposed outside the housing package, and the housing package has a window transparent to ultraviolet light or violet light for irradiating on the substrate therethrough the ultraviolet light or violet light emitted from the light source.

4. The optical waveguide device according to claim 3, wherein the window is a diffusion plate that diffuses and transmits the ultraviolet light or violet light.

5. The optical waveguide device according to claim 3, wherein the light source is disposed at a location at which said light source can irradiate the ultraviolet light or violet light on the substrate through the window.

6. The optical waveguide device according to claim 1, wherein an intensity of ultraviolet light or violet light irradiated on the substrate is equal to or higher than 10 mW/cm$^2$.

7. The optical waveguide device according to claim 1, wherein the at least one light source irradiates ultraviolet light or violet light uniformly on the substrate.

8. An optical waveguide device comprising:

a housing package;

a substrate with an electro-optic effect which is accommodated in the housing package and on which an optical waveguide and an electrode for controlling optical waves propagating through the optical waveguide are formed; and a plurality of light sources for irradiating ultraviolet light or violet light on the substrate in a state in which an electric field is not applied to the substrate, wherein the plurality of the light sources are arranged in a longitudinal direction of the substrate, wherein irradiation of ultraviolet light or violet light on the substrate with the plurality of light sources is carried out when an amount of bias drift in the control of the optical wave with the electrode exceeds a predetermined amount.

* * * * *